(12) United States Patent
Noto

(10) Patent No.: US 7,477,311 B2
(45) Date of Patent: *Jan. 13, 2009

(54) IMAGE-TAKING APPARATUS AND SYSTEM

(75) Inventor: Goro Noto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 549 days.

This patent is subject to a terminal disclaimer.

(21) Appl. No.: 11/093,867

(22) Filed: Mar. 30, 2005

(65) Prior Publication Data

US 2005/0219402 A1    Oct. 6, 2005

(30) Foreign Application Priority Data

Mar. 31, 2004  (JP)  ............................. 2004-108504
Mar. 31, 2004  (JP)  ............................. 2004-108505

(51) Int. Cl.
*H04N 5/232* (2006.01)
*H04N 5/222* (2006.01)

(52) U.S. Cl. .................................. 348/345; 348/333.09
(58) Field of Classification Search ................. 348/335, 348/360, 333.06, 333.09, 344, 345, 362, 348/363

See application file for complete search history.

(56) References Cited

FOREIGN PATENT DOCUMENTS

| JP | 10-336495 | 12/1998 |
|---|---|---|
| JP | 2000-162494 | 6/2000 |
| JP | 2001-125173 | 5/2001 |
| JP | 2001-215406 | 8/2001 |
| JP | 2001-275033 | 10/2001 |

*Primary Examiner*—Lin Ye
*Assistant Examiner*—Trung Diep
(74) *Attorney, Agent, or Firm*—Cowan, Liebowitz & Latman, P.C.

(57) ABSTRACT

There is disclosed an image-taking apparatus that prevents a defocus of a subject image observed after a viewfinder mode switches when the focus control uses the same focus detecting unit for OVF and EVF modes. The image-taking apparatus includes a focus detecting unit for detecting focus of the image-taking lens, and a mirror unit for switching between a first state used to introduce the light from the image lens into the viewfinder optical system and the focus detecting unit, and a second state used to introduce the light to the image-pickup device and the focus detecting unit. The controller controls driving of the mirror unit and driving of a focus lens based on a detection result by the focus detecting unit. The controller prohibits the driving of the mirror unit while the focus lens is being driven.

12 Claims, 13 Drawing Sheets

IMAGE-TAKING APPARATUS AND SYSTEM

BACKGROUND OF THE INVENTION

The present invention relates to an image-taking apparatus, and more particularly to an image-taking apparatus that enables a user to arbitrarily switch a viewfinder mode by operating a mirror unit.

A single lens reflex camera as one image-taking apparatus reflects the light emitted from an image-taking lens via a mirror closer to an image surface than the image-taking lens, and introduces the light to the optical viewfinder ("OVF"). Thereby, a photographer can view an erect object image formed by the image-taking lens. The mirror is obliquely provided on a shooting optical path.

In shooting an object image, the mirror retreats from the shooting optical path, and enables the light from the image-taking lens to such an imaging medium as a film and an image-pickup device, such as a CCD. After the shot, the mirror is obliquely arranged on the shooting optical path.

Some digital single lens reflex cameras can select two types of focusing, i.e., a manual phase difference detection and a contrast detection (Japanese Patent Application, Publication No. 2001-275033). The phase difference detection determines focus when the mirror is obliquely provided on the shooting optical path, and the contrast detection determines focus using an output from the image-pickup device, when the mirror retreats from the shooting optical path (Japanese Patent Application, Publication No. 2001-125173). A camera of Japanese Patent Application, Publication No. 2001-125173 electronically displays an image read from the image-pickup device on an electronic viewfinder ("EVF"), determines focus by the contrast detection, and measures the subject brightness using an output from the image-pickup device.

In general, the contrast detection seeks a position having a maximum AF evaluation value by slightly moving the image-taking lens in the optical axis direction, and disadvantageously requiring a long time to determine focus. On the other hand, the phase difference detection moves the image-taking lens by a detected defocus amount, and needs a shorter time to determine focus than the contrast detection.

Some digital single lens reflex cameras include a focus detecting unit of the phase difference detection in each of a lens unit and a camera body (Japanese Patent Application, Publication No. 2000-162494). According to this camera, when a mirror used to switch an optical path is located on the shooting optical path, the focus detecting unit in the camera body detects focus, and when the mirror retreats from the shooting optical path, the focus detecting unit in the lens unit detects focus. Wherever the mirror moves, the focus detecting unit detects focus by the phase difference detection and accelerates focusing.

A camera that has the mode selector that selects a shooting mode activates an EVF, when a mode selector selects a macro mode, and captures a subject image while enabling the subject image to be observed on the EVF. The camera deactivates the EVF in a shooting mode other than the macro mode, and captures a subject image while enabling the subject image to be observed on an OVF (Japanese Patent Application, Publication No. 10-336495).

Disadvantageously, the camera proposed in Japanese Patent Application, Publication No. 2000-162494 has the reduced imaging light intensity for the camera body due to the mirror that introduces the light into the focus detecting unit in the lens unit. In addition, since each of the lens unit and the camera body has the focus detecting unit, the lens unit becomes large and expensive.

The instant inventor has proposed a single lens reflex camera that displaces a mirror unit on a shooting optical path and enables a user to arbitrarily switch between the OVF mode used to introduce the light from the image-taking lens to the viewfinder optical system and focus detecting unit, and the EVF mode used to introduce the light into the image-pickup device and the focus detecting unit (see the following embodiment in this specification). This camera, whichever viewfinder mode it has, detects focus by the focus detecting unit provided in the camera body and control focus based on a detection result. This camera retreats the mirror unit from the shooting optical path during the shooting time or image recording time.

In this camera, the EVF mode in which the light reaches the image-pickup device after transmitting through the mirror unit, offsets a focus position of the subject image from a shooting time when the light reaches the image-pickup device without intervening the mirror unit, by a change of the optical path length due to a refraction in the mirror unit. Therefore, the EVF mode corrects a driving position of the focus lens, which is calculated based on the detection result by the focus detecting unit, by the offset amount of the focus position. Thus, even for the same subject distance, the target driving position of the focus lens is different between focusing in the OFV mode and focusing in the EFV mode.

As a consequence, when the user switches a current viewfinder mode among the EVF and OFV modes to the other mode while the focus lens is being driven to the target position, a defocus occurs when the driving of the focus lens ends due to the above difference between the target driving positions.

An application of a structure proposed in Japanese Patent Application, Publication No. 10-336495 to a single lens reflex camera causes a switch of viewfinder mode between the EVF and OVF modes when a shooting mode selector is operated in a playback mode use to play and display a recorded image. When the shooting mode is switched to the playback mode and the playback mode is switched back to the shooting mode, a photographer feels discomfort because a viewfinder mode for the current shooting mode is different from the viewfinder mode for the previous shooting mode.

BRIEF SUMMARY OF THE INVENTION

Accordingly, it is an exemplary object of the present invention to provide an image-taking apparatus that controls focus using the same focus detecting unit for both the OFV and EVF modes, and prevents a defocus of a subject image observed after switching a viewfinder mode. Another illustrative object of the present invention is to provide an image-taking apparatus that eliminates a disadvantage associated with a switch of the viewfinder mode from a playback mode to the shooting mode.

An image-taking apparatus according to one aspect of the present invention includes an image-pickup device for photoelectrically converting a subject image formed by light from an image-taking lens, a viewfinder optical system for enabling the subject image to be observed using the light, a focus detecting unit for detecting focus of the image-taking lens using the light, a mirror unit for switching between a first state used to introduce the light into the viewfinder optical system and the focus detecting unit, and a second state used to introduce the light to the image-pickup device and the focus detecting unit, and a controller for controlling driving of the mirror unit and driving of a focus lens in the image-taking lens based on a detection result by the focus detecting unit, wherein the controller prohibits the driving of the mirror unit while the focus lens is being driven.

An image-taking apparatus according to another aspect of the present invention includes an image-pickup device for photoelectrically converting a subject image formed by light from an image-taking lens, a viewfinder optical system for enabling the subject image to be observed using the light, a mirror unit for switching between a first state used to reflect the light to the viewfinder optical system, and a second state used to transmit the light to the image-pickup device, and a controller for controlling driving of the mirror unit, and for operating between a first mode used to record an image using an output from the image-pickup device, and a second mode used to display a playback image, wherein the controller prohibits the driving of the mirror unit while the focus lens is being driven.

Other objects and further features of the present invention will become readily apparent from the following description of the preferred embodiments with reference to the accompanying drawings.

DETAILED DESCRIPTION OF THE PREFERRED EMBODIMENTS

Referring now to the accompanying drawings, a description will be given of the preferred embodiment.

Figure 4:
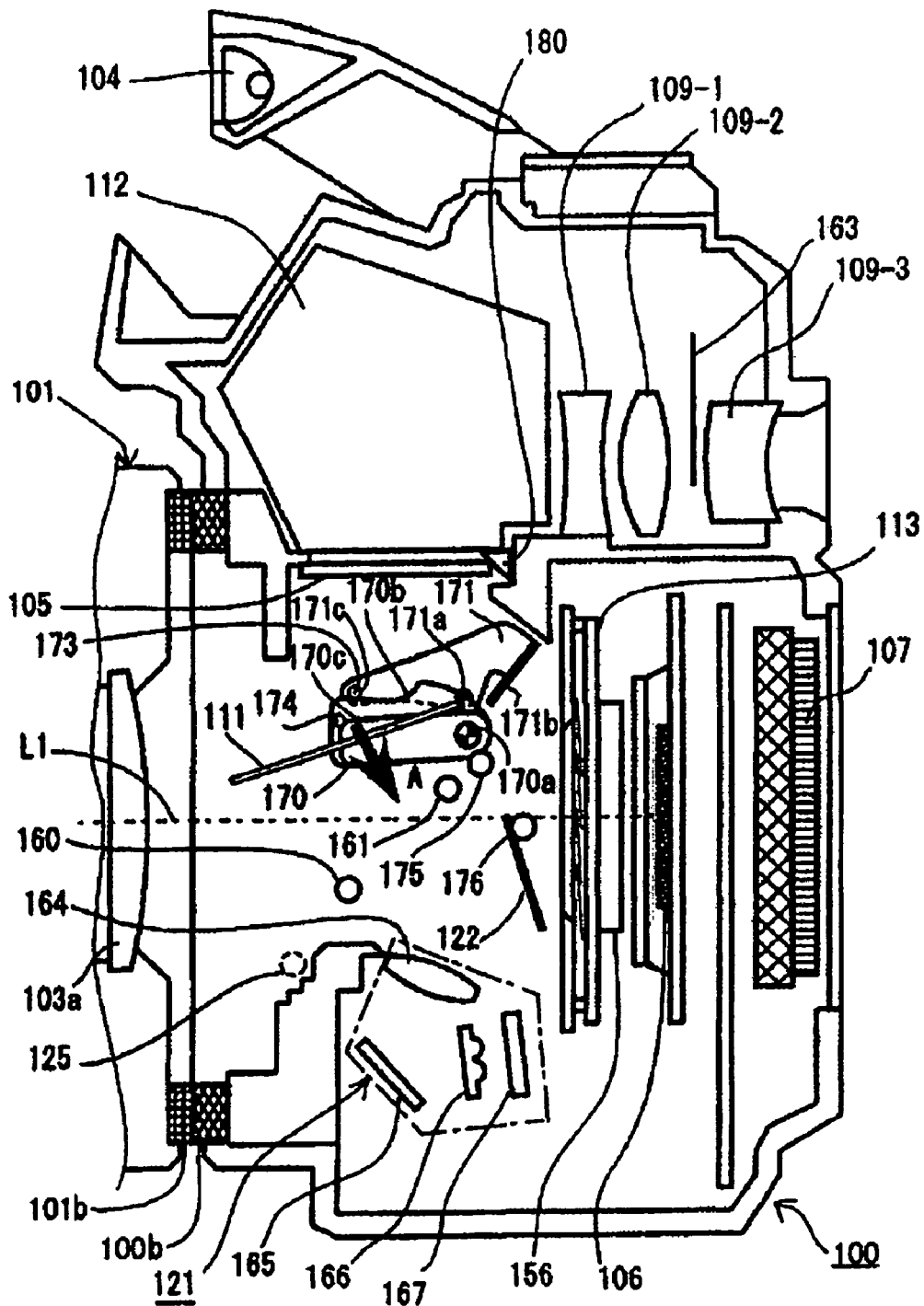
FIG. 4 is a sectional view of the camera system of one embodiment, which is switching from a first optical path splitting state to a third optical path splitting state.
Figure 5:
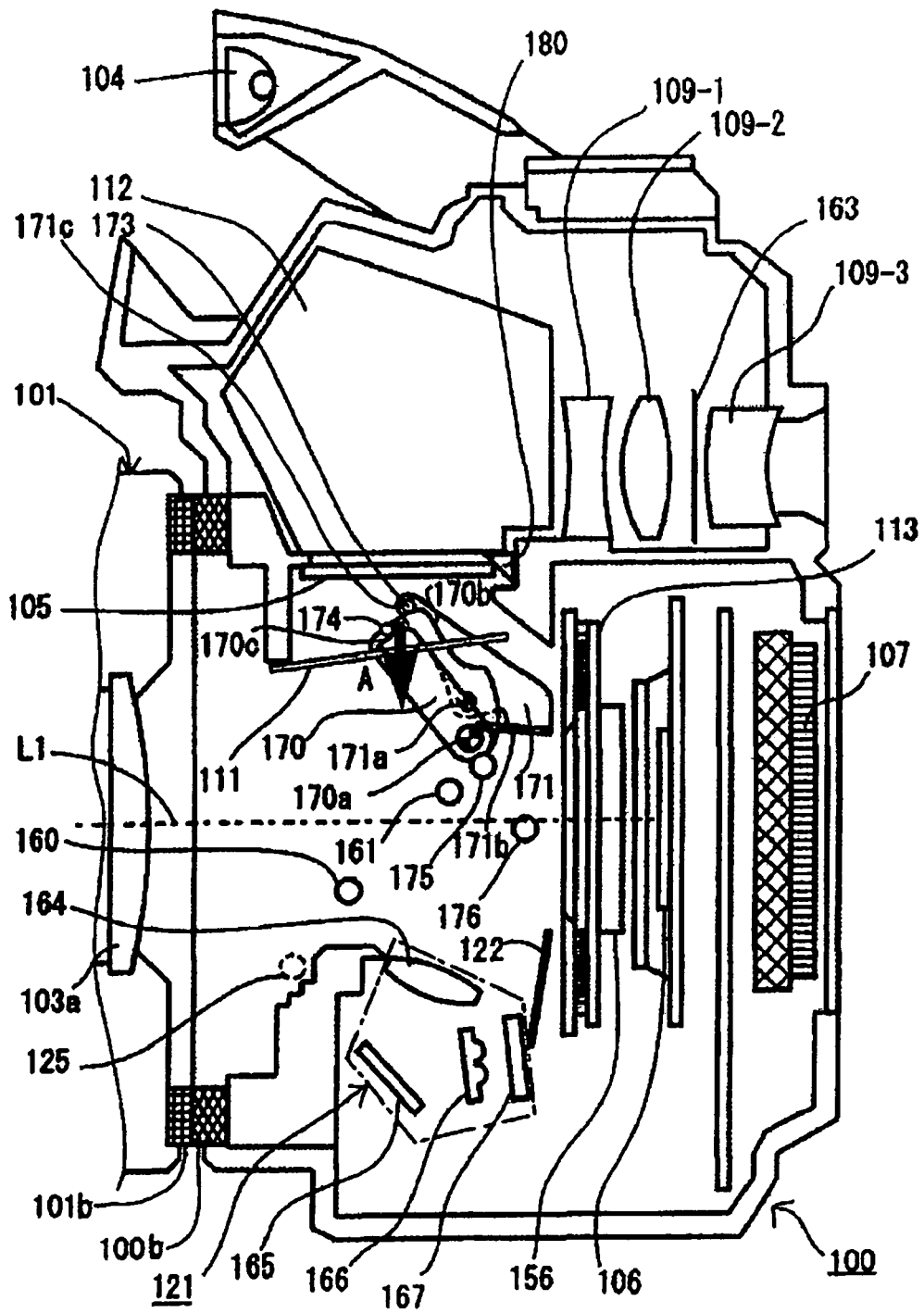
FIG. 5 is a sectional view of the camera system of one embodiment in the third optical path splitting state.
Figure 6:
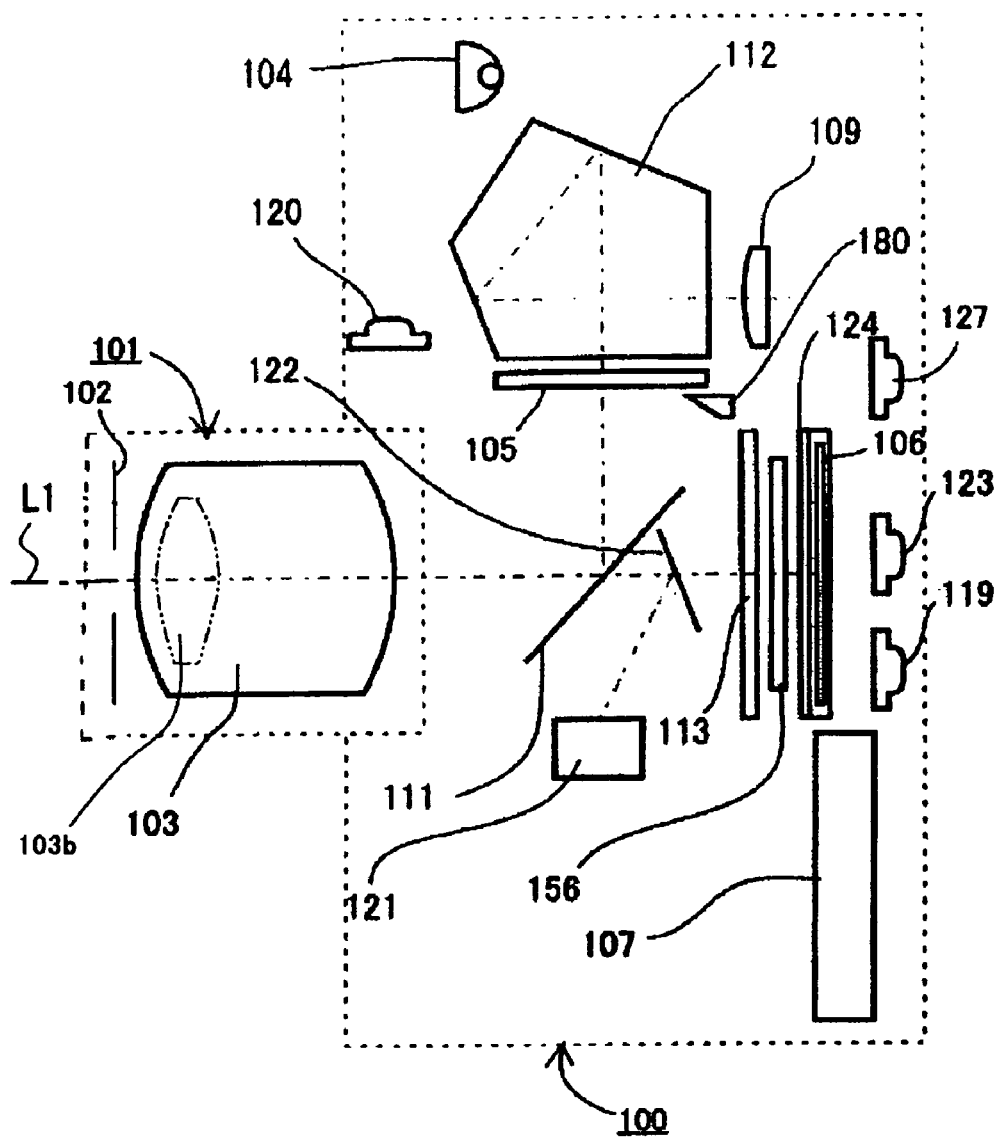
FIG. 6 is a schematic view of an optical configuration of the camera system according to one embodiment.

FIGS. 1 to 7 show a camera (or shooting) system according to one embodiment of the present invention. FIG. 6 shows a schematic optical structure of the camera system of this embodiment. This camera system includes a camera body (or an image-taking apparatus) and a lens unit that is detachably attached to the camera body.

The camera is a one-CCD digital color camera that uses an image-pickup device, such as a CCD and a CMOS sensor, drives the image-pickup device continuously or for each shot, and obtains an image signal indicative of a motion or still image. The image-pickup device is an area sensor that converts the exposure light into an electric signal for each pixel, and stores and reads electric charges corresponding to the received light intensity.

In FIG. 6, 100 denotes a camera body, and 101 denotes a lens unit that is detachable from the camera body 100. The lens unit 101 includes a stop 102 and an image-taking optical system 103. The lens unit 101 is electrically and mechanically connected to the camera body 100 via a known mounting mechanism. Shooting screens with various angles of field are available by connecting the lens units 101 having different focal lengths to the camera body 100.

In focusing an image-taking optical system, the lens unit 101 moves a focus lens 103b in an image-taking optical system 103 along an optical axis L1 via a driving mechanism (not shown), or makes the focus lens 103b of an flexible or elastic transparent element or liquid lens and varies an interface shape and thus a refractive power.

106 denotes an image-pickup device housed in a package 124. On an optical path from the image-taking optical system 103 to the image-pickup device 106, an optical low-pass filter 156 is provided which restricts a cutoff frequency of the image-taking optical system 103 and prevents excessively high space frequency component of the object image (or optical image) from transmitting to the image-pickup device 106. The image-taking optical system 103 has an infrared ray (IR) cut filter (not shown).

A signal read from the image-pickup device 106 is displayed as image data on a display unit 107 after processed as follows. The display unit 107 is attached to a back surface of the camera body 100, and a user can directly observe a display on the display unit 107.

The display unit 107 that includes an organic EL spatial modulator, a liquid crystal spatial modulator, and a spatial modulator that utilizes electrophoresis of fine particles saves the consumption power and becomes thin, making the camera body 1 energy-efficient and small.

Specifically, the image-pickup device 106 is a CMOS process compatible sensor (simply "CMOS sensor" hereinafter) as one amplification CCD. One characteristic of the CMOS sensor is that a single process can form the MOS transistor and peripherals in the area sensor such as an image-pickup device driver, an AD converter and an image processor, remarkably reducing the number of masks and the processing step in comparison with the CCD. Another characteristic is a random access to an arbitrary pixel, which facilitates readout of a cut image for display, and provides real-time displays at a high display rate on the display unit 107.

The image-pickup device 106 uses the above characteristics to output images to be displayed (partially cut readouts of the light receiving area on the image-pickup device 106) and to output fine images (full readouts of the light receiving area).

111 denotes a movable half mirror (a first mirror member) for reflecting part of the light from the image-taking optical system 103, and for transmitting the rest of the light. The half mirror 111 has a refractive index of about 1.5 and a thickness of 0.5 mm. 105 denotes a focusing screen arranged on an expected imaging surface of the object image formed by the image-taking optical system 103. 112 denotes a pentaprism.

Figure 1:
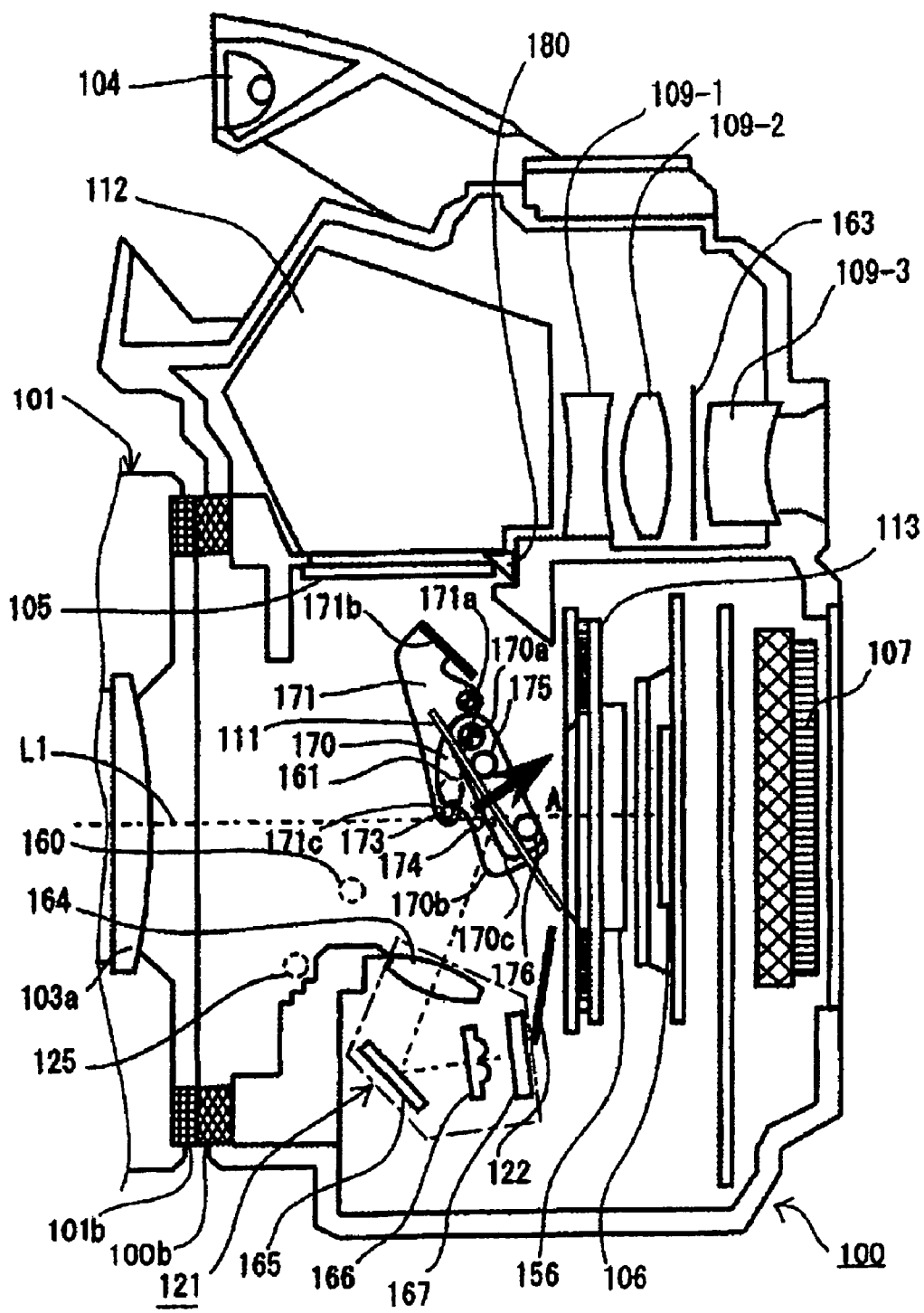
FIG. 1 is a sectional view of a camera system at a second optical path splitting state according to one embodiment of the present invention.

109 denotes a viewfinder lens that observes an object image formed on the focusing screen, and actually includes three viewfinder lenses 109-1, 109-2 and 109-3 in FIG. 1. The focusing screen 105, the pentaprism 112 and the viewfinder lens 109 constitute a viewfinder optical system.

A movable sub-mirror (or a second mirror member) 122 is provided behind the half mirror 111 (at the image surface side), which reflects and introduces to the focus detecting unit 121 the light that has transmitted through the half mirror 111 and close to the optical axis L1. The sub-mirror 122 rotates around a rotating axis 125 (see FIG. 1 etc.), which will be described later, and is housed in the lower portion of the mirror box in accordance with an action of the half mirror 111. The sub-mirror 122 is not operably integrated with the half mirror, and independently projects to and retreats from the shooting optical path.

The focus detecting unit 121 receives the light from the sub-mirror 122, and determines focus by the phase difference detection.

An optical path splitting system that includes the half mirror 111 and the sub-mirror 122 is adapted to switch among first to third optical path splitting states, as described later. In the first optical path splitting state (or a first state), the light from the image-taking optical system 103 is reflected on the half mirror 111 and introduced to the finder optical system, while the light that has transmitted through the half mirror 111 is reflected on the sub-mirror 122 and introduced to the focus detecting unit 121.

The first optical path splitting state enables the object image formed by the above light to be observed via the viewfinder lens 109, and the focus detecting unit 121 to detect focus. FIG. 6 shows the first optical path splitting state.

In the second optical path splitting state, the light from the image-taking optical system 103 transmits through the half mirror 111, reaches the image-pickup device 106 through the half mirror 111, and is reflected on the half mirror 111 and introduced to the focus detecting unit 121. The second optical path splitting state enables the captured image data to be displayed on the real-time basis on the display unit 107, and provides high-speed continuous shooting. Since the second optical path splitting state does not drive the optical path splitting system in shooting by the image-pickup device 106, the high-speed continuous shooting is available by accelerating operations in the signal processing system.

The second optical path splitting state enables the focus detecting unit 121 to determine focus. Therefore, during monitoring on the display unit 107, the high-speed focusing is available by the phase difference detection.

Since the light from the image-taking optical system 103 reaches the image-pickup device 106 in the second optical path splitting state, the contrast detection that uses an output from the image-pickup device 106 may determine focus, in addition to the above focusing by the phase difference detection, for more highly precise focusing.

The third optical path splitting state directly introduces the light from the image-taking optical system 103 to the image-pickup device 106, and retreats the half mirror 111 and sub-mirror 122 from the shooting optical path. The third optical path splitting state is used to generate a fine image suitable for large printing etc.

A mirror driving mechanism having an electromagnetic motor and gears (not shown) switches the optical path splitting system among the first to third optical path splitting states by displacing the half mirror 111 and the sub-mirror 122, respectively. A camera system controller 135 controls driving of the mirror driving mechanism via a mirror driving controller 145 as described later.

The half mirror 111 is made of lightweight transparent resin for quickly switching among the above three optical path splitting states. A birefringent polymer thin coating is pasted on the back surface of the half mirror 111 (or a surface on the side of sub-mirror 122 in FIG. 6). This provides a strong low-pass effect when the shot does not use all the pixels of the image-pickup device 106, for example, for image monitoring (with a real-time display) and high-speed continuous shooting.

A fine pyramid periodic structure having a pitch smaller than a wavelength of the visible light on the surface of the half mirror 111 may provide a so-called photonic crystal effect to reduce the surface reflection caused by the refractive index difference between the air and resin and to improve light use efficiency. This structure prevents the ghost due to multi-reflections on the front and back surfaces of the half mirror 111.

104 denotes a movable flashing unit that is movable between an accommodated position at which the unit is housed in the camera body 100 and an emission position at which the unit projects from the camera body 100. 113 denotes a focal plane shutter that adjusts the light intensity incident upon the image surface. 119 denotes a main switch that activates the camera body 100.

120 denotes a two-stage pressing release button. The half-press (SW1 ON) starts a shooting preparation, such as photometry and focusing, and the full-press (SW2 ON) starts shooting (or storing image data read from the image-pickup device 106 in the recording medium).

123 denotes a viewfinder mode switch that switches between the OVF and EVF modes whenever it is pressed. 127 denotes a shooting/playback mode switch as an operation member, which switches between a playback mode as a second mode used to play and display shot images, and a shooting mode as a first mode relating to shooting including a viewfinder observation and recording of an image.

180 denotes an information display unit in the OVF, and displays specific information on the focusing screen 105.

Figure 7:
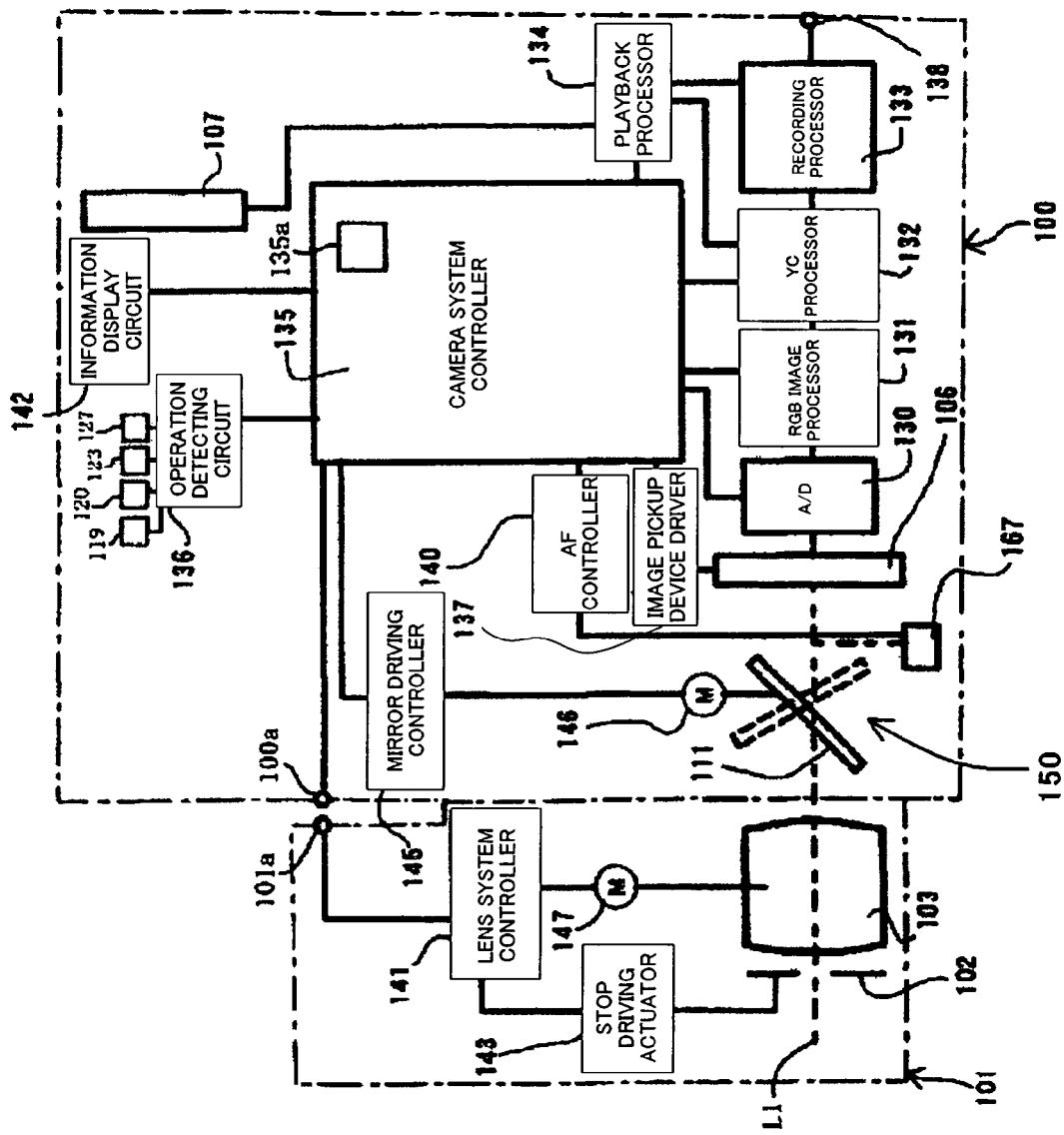
FIG. 7 is a block diagram showing an electric configuration of the camera system according to one embodiment.

FIG. 7 is a block diagram showing an electric configuration of a camera system in this embodiment. Here, those elements described with reference to FIG. 6 are designated by the same reference numerals. A description starts with the shooting and recording of an object image.

The camera system includes an image-taking system, an image processing system, a recording/playback system, and a control system. The image-taking system includes the image pickup optical system 103 and image-pickup device 106. The image processing system includes an A/D converter 130, a RGB image processor 131, and a YC image processor 132. The recording/playback system includes a recording processor 133 and a playback processor 134. The control system includes a camera system controller 135 that serves as a controller of the camera system, an operation detecting circuit 136, and an image-pickup device driver 137.

138 denotes a standardized connection terminal connectable to an external computer etc. for data communications. The above electric circuit drives in response to power supply from a small fuel battery (not shown).

The image-taking system is an optical processing system that images the light from the object onto the image pickup surface of the image-pickup device 106 via the image pickup optical system 103. Control over a shutter (not shown) in the image pickup optical system 103 and necessary driving of the focal plane shutter 113 will allow the image-pickup device 106 to receive the object light at proper light intensity.

The image-pickup device 106 uses an image-pickup device having totally about 10 million pixels with 3,700 square pixels in a longitudinal direction and 2,800 square pixels in a lateral direction. R (red), G (green) and B (blue) color filters are alternately arranged on respective pixels to form a so-called Bayer arrangement having plural sets of four pixels.

The Bayer arrangement improves collective image performance by arranging more G pixels which an observer feels more strongly in viewing an image than R and B pixels. In general, image processing using this type of image-pickup device generates a brightness signal mainly from G and a color signal from RGB.

A signal read from the image-pickup device 106 is supplied to an image processing system via the A/D converter 130, and the image processing system generates image data through image processing.

The A/D converter 130 is a signal converter that converts, in accordance with the amplitude of a signal read from each pixel of the image-pickup device 106, an output signal from the image-pickup device 106 into, for example, a 10-bit digital signal and outputs the signal. As a result, the subsequent image processing is executed digitally.

The image processing system is a signal processor to obtain an image signal of a desired format from the RGB digital signals, and converts the RGB color signals into a YC signal that is expressed by a brightness signal Y and a color-difference signal (R-Y) and (B-Y), or another signal.

The RGB image processor 131 is a signal processor that processes an output signal from the A/D converter 130, and includes a white balance circuit, a y-correction circuit, and an interpolation operator that provide high resolution using the interpolation operation.

The YC processor 132 is a signal processor that generates the brightness signal Y and color-difference signals R-Y and B-Y. This YC processor 132 includes a high-range brightness signal generator for a high-range brightness signal YH, a low-range brightness signal for a low-range brightness signal YL, and a color-difference generator that generates the color-difference signals R-Y and B-Y. The brightness signal Y is formed by synthesizing the high-range and low-range brightness signals YH and YL.

The recording/playback system is a processing system that outputs an image signal to a memory (not shown) and an image signal to the display unit 107. The recording processor 133 writes down the image signal in and reads out the image signal from the memory, and the playback processor 134 reproduces the image signal read from the memory, and outputs it to the display unit 107.

The recording processor 133 includes a compression/decompression circuit that compresses the YC signal indicative of the still and motion-picture image data in a predetermined compression format, and decompresses the compressed data. The compression/decompression circuit includes a frame memory etc. for signal processing, and stores the YC signal from the image processing system in this frame memory, reads, compresses and encodes a stored signal from each of plural blocks. The compression and encoding may, for example, use a two-dimensional orthogonal conversion, normalization and Huffman coding of the image signal for each block.

The playback processor 134 is a circuit that matrix-converts the brightness signal Y and color-difference signals R-Y and B-Y, for example, into the RGB signal. A signal converted by the playback processor 134 is output to the display unit 107, and displayed or reproduced as a visual image. The playback processor 134 and the display unit 107 may be connected via a wireless communication means, such as Bluetooth, and this configuration enables the image shot by this camera to be monitored at a remote location.

The operation detecting circuit 136 in the control system detects operations of a main switch 119, a release button 120, and a viewfinder switch 123, a shooting/playback switch 127, and other switches (although the other switches are not shown), and outputs the detection result to the camera system controller 135.

The camera system controller 135 receives the detection signal from the operation detecting circuit 136, and operates in accordance with the detection result. The camera system controller 135 generates a timing signal for shooting and outputs it to the image-pickup device driver 137.

The image-pickup device driver 137 generates a driving signal used to drive the image-pickup device 106 in response to a control signal from the camera system controller 135. The information display circuit 142 receives a control signal from the camera system controller 135, and controls driving of the OVF information display unit 180.

The control system controls driving of the image-taking system, image processing system and recording/playback system in response to operations of various switches of the camera body 100. For example, when a press of the release button 120 turns on SW2, the control system (or the camera system controller 135) controls driving of the image-pickup device 106, operations of the RGB image processor 131, and compression of the recording processor 133. In addition, the control system controls driving of the OVF information display unit 180 via the information display circuit 142, and changes a display (or a state of the displayed segment) in the OVF.

The mirror driving controller 145 receives a control signal from the camera system controller 135, and controls driving of the mirror motor 146 as a driving source of the half mirror 111 and the sub-mirror 122 (which are not shown in FIG. 7). The driving force of the mirror motor 146 is transmitted to a mirror driving mechanism 150, and the half mirror 111 and sub-mirror 122 can switch among the first to third optical path splitting states as described above.

A description will now be given of focusing of the image pickup optical system 103.

The camera system controller 135 is connected to an AF controller 140. The camera system controller 135 is connected to a lens system controller 141 in the lens unit 101 via mount contacts 100a and 101a when the lens unit 101 is attached to the camera body 100. The camera system controller 135 transmits necessary for specific processing to and receives the data from AF controller 140 and the lens system controller 141.

The focus detecting unit 121 (or focus detecting sensor 167) outputs to the AF controller 140 a detection signal from a focus detection area that is provided in place on a shooting screen. The AF controller 140 generates a focus detecting signal based on an output signal from the focus detecting unit 121, and detects a focus state (or a defocus amount) of the image pickup optical system 103. The AF controller 140 converts the detected defocus amount into a driving amount of the focus lens 103b, and sends the information on the driving amount of the focus lens 103b to the lens system controller 141 via the camera system controller 135.

In focusing the moving object, the AF controller 140 predicts a proper stop position of the focus lens 103b by considering the time lag from the full press of the release button 120 to an actual start of the image pickup control. The information on the driving amount of the focus lens 103b to the predicted stop position is sent to the lens system controller 141.

When the camera system controller 135 determines that the brightness of the object is too low to obtain the sufficient focus detecting accuracy based on the output signal of the image-pickup device 106, the flashing unit 104 or the white LED or fluorescent tube (not shown) of the camera body 100 is driven to illuminate the object.

When the lens system controller 141 receives the information on the driving amount of the focus lens from the camera system controller 135, the lens system controller 141 controls driving of the AF motor 147 in the lens unit 101 and moves the focus lens 103b along the optical axis L1 by the driving amount via the driving mechanism (not shown). Thereby, the image pickup optical system 103 is at the in-focus state. As described above, if the focus lens includes a liquid lens etc., the interface shape will be changed.

When the lens system controller 141 receives information on an exposure (or stop) value from the camera system controller 135, the lens system controller 141 controls driving of the stop driving actuator 143 in the lens unit 101 and operates the stop 102 so that it has an aperture diameter corresponding to the above aperture value, thereby directing the object light at the proper light intensity to the image surface side.

When the AF controller 140 detects focus on the object, the detection result is sent to the camera system controller 135. When the full press of the release button 120 turns on SW2, the shooting follows through the image-taking system, image processing system and recording/playback system as described above.

FIGS. 1 to 5 are sectional views of the camera system of this embodiment, and show part of the lens unit 101. Those elements described with reference to FIG. 6 are designated by the same reference numerals.

Figure 2:
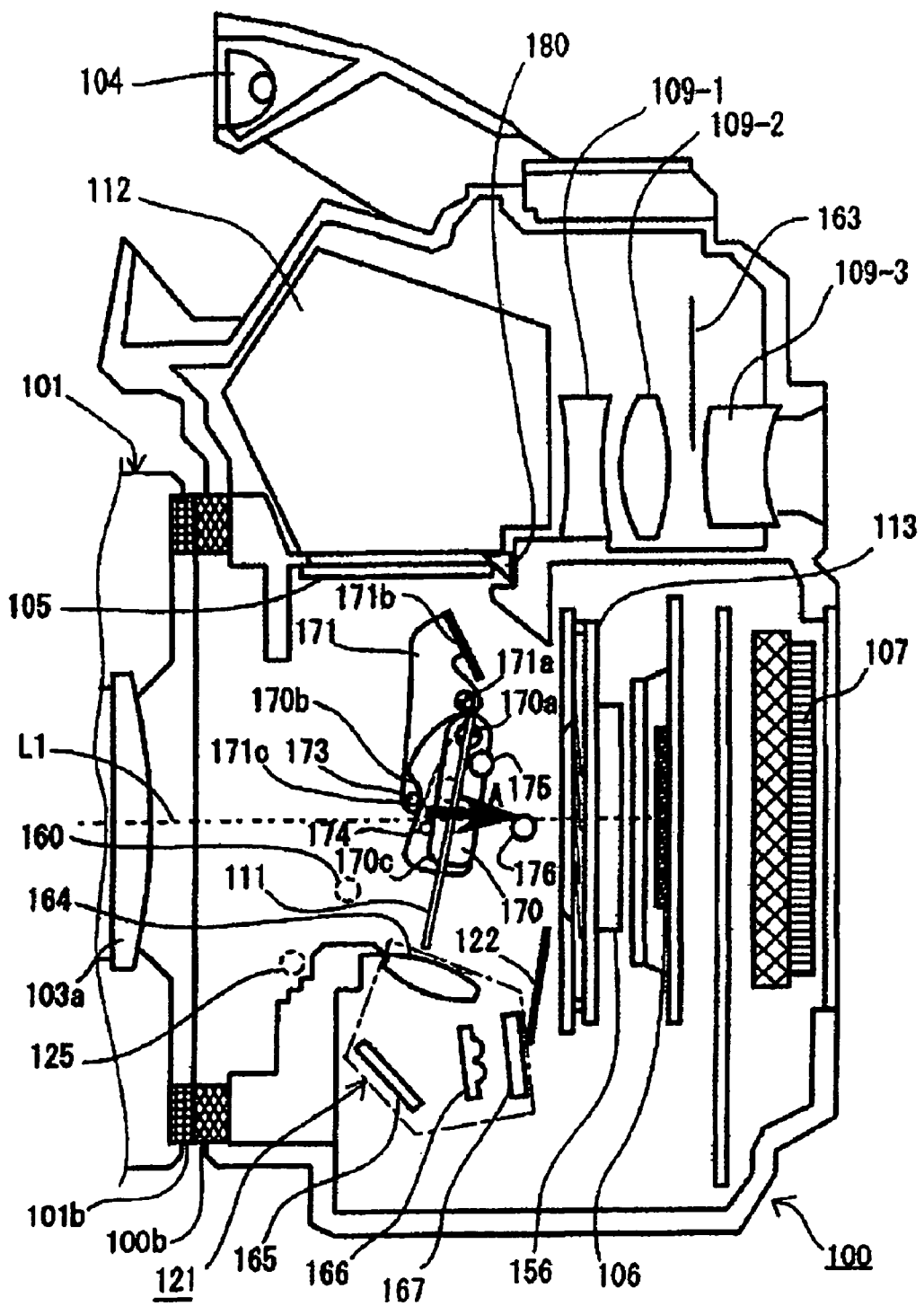
FIG. 2 is a sectional view of the camera system according to this embodiment, which is switching from a first optical path splitting state to a second optical path splitting state.
Figure 3:
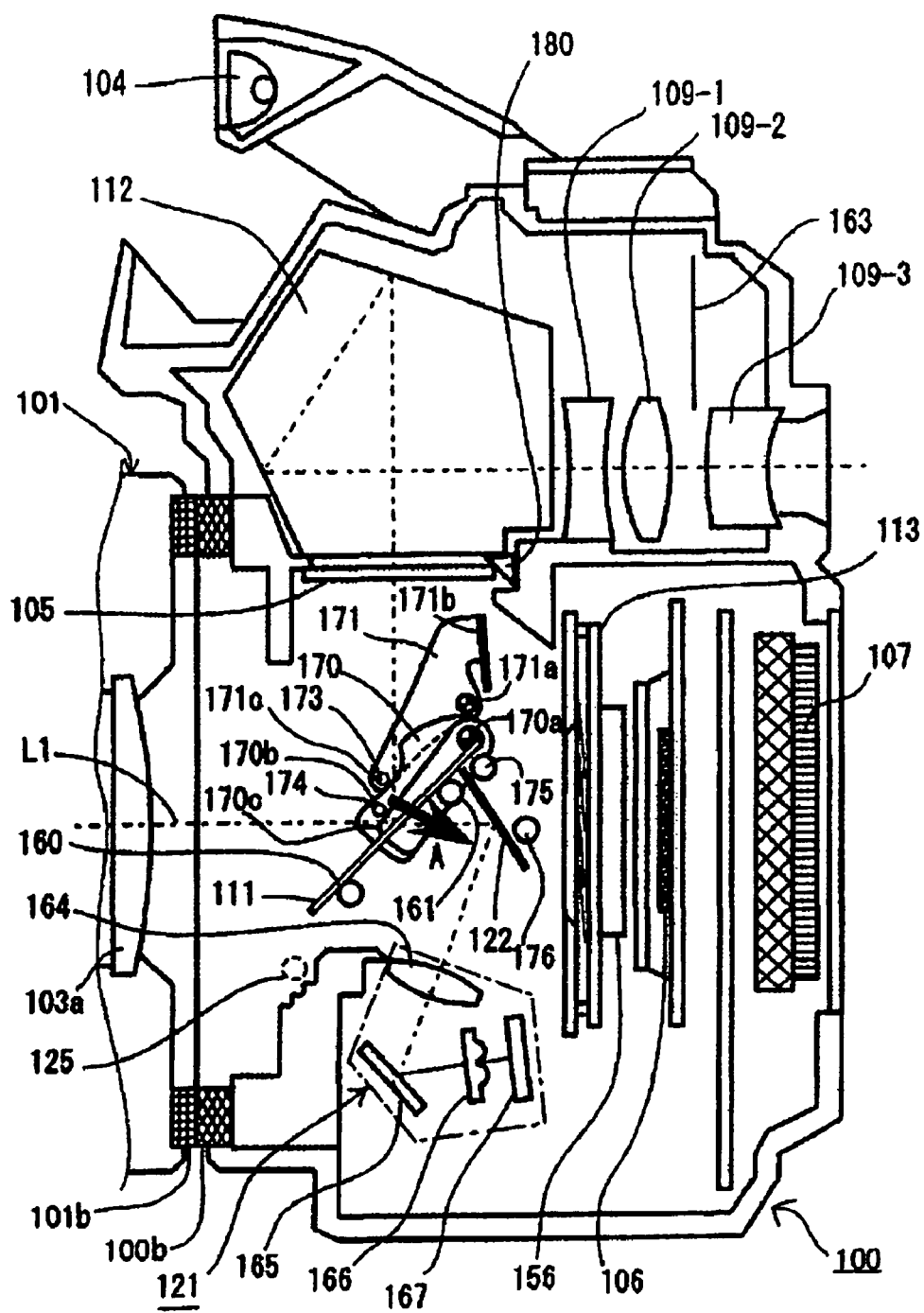
FIG. 3 is a sectional view of the camera system of one embodiment in the first optical path splitting state.

FIG. 1 is a sectional view of the camera system in the second optical path splitting state. FIG. 2 is a sectional view of the camera system that is switching from the first optical path splitting state to the second optical path splitting state. FIG. 3 is a sectional view of the camera system in the first optical path splitting state. FIG. 4 is a sectional view of the camera system that is switching from the first optical path splitting state to the third optical path splitting state. FIG. 5 is a sectional view of the camera system in the third optical path splitting state.

Referring now to FIG. 3, a description will be given of the configuration of the camera system when the optical path splitting system as the mirror unit that includes the half mirror 111 and sub-mirror 122 is in the above first optical path splitting state.

In FIG. 3, 100 denotes a camera body, and 101 denotes a lens unit. The lens unit 101 is attached to a camera mount 100b via a lens mount 101b. 103a denotes an image-taking lens closest to the image surface among plural lenses in the image pickup optical system 103. 105 denotes a focusing screen in the viewfinder optical system. 107 denotes a display unit. 163 denotes an eyepiece shutter.

164 denotes a condenser lens as a light receiving window in the focus detecting unit 121. 165 denotes a mirror that reflects the light from the condenser lens 164. 166 denotes a re-imaging lens for imaging the light reflected on the mirror 165 onto the focus detecting sensor 122. 122 denotes a focus detecting sensor.

111 denotes a movable half mirror that is held on a half-mirror receiving plate (not shown). Pins 173 are provided at both side edges of the half-mirror receiving plate in the direction perpendicular to the paper. A pin 174 is provided at one side edge in the direction perpendicular to the paper. The half mirror 111 and pins 173 and 174 move together.

170 denotes a half-mirror driving lever, and 171 denotes a half-mirror support arm. The half-mirror driving lever 170 is rotatably supported around a rotating shaft 170a that is fixed on the camera body 100, and the half-mirror support arm 171 is rotatably supported around the rotating shaft 171a that is fixed on the camera body 100.

The half-mirror support arm 171 is connected to an approximately similarly shaped structure provided at the wall surface side opposing to the mirror box via a connector 171b. The pins 173 at both sides of the half-mirror receiving plate (not shown) are engaged with the perforation holes 171c at the top of the half-mirror support arm 171. Thereby, the half mirror 111 is rotatable around the perforation hole 171c via the half-mirror receiving plate.

The half-mirror receiving plate is forced in the arrow A direction by a torsion spring (not shown) that is located in the middle of the pins 173 and 174, and the force of the torsion spring is also applied to the half mirror 111 via the half-mirror receiving plate.

In the first optical path splitting state, the mirror stoppers 160 and 161 project into the moving area of the half mirror 111, and contact the half mirror due to the force by the torsion spring. There are slight apertures between the pin 173 and a first cam surface 170b of the half-mirror driving lever 170, and between the pin 174 and a second cam surface 170b of the half-mirror driving lever 170. Thereby, the half mirror 111 is positioned as shown in FIG. 3.

The mirror stoppers 160 and 161 can project into and retreat from the moving area of the half mirror 111 due to driving of the mirror driving mechanism 150. The mirror stoppers 160 and 161 are located outside the shooting optical path in place that does not affect the shooting light, irrespective of whether or not they are located in the moving area of the half mirror 111. The following mirror stoppers 175 and 176 are similarly located outside the shooting optical path.

The sub-mirror 122 is rotatable around the rotating shaft 125, and held at a position that reflects the transmission light from the half mirror 111 to the side of the focus detecting unit 121 or the condenser lens 164 as shown in FIG. 3 in the first optical path splitting state.

In the first optical path splitting state, part of the light from the image pickup optical system 103 is reflected on the half mirror 111 and introduced into the viewfinder optical system, and the rest of the light transmits through the half mirror 111, is reflected on the sub-mirror 122, and is introduced into the focus detecting unit 121.

When the mirror stoppers 160 and 161 shown in FIG. 3 retreat from the moving area of the half mirror 111, the half mirror 111 shifts to the state shown in FIG. 2 due to the force in the arrow A direction by the torsion spring (not shown). Due to the force by the torsion spring, the pin 173 contacts the first cam surface 170b of the half-mirror driving lever 170 and the pin 174 contacts the second cam surface 170c of the half-mirror driving lever 170.

The pins 173 and 174 slide along the first and second cam surfaces 170b and 170c as the half-mirror driving lever 170 rotates, and the orientation of the half mirror 111 changes: The half-mirror support arm 171 rotates as the the half-mirror driving lever 170 rotates, and the half-mirror receiving plate (not shown) and the half mirror 111 move together, which half-mirror receiving plate is connected to the half-mirror driving lever 170 and the half-mirror support arm 171 via the pins 173 and 174.

As the half-mirror driving lever 170 and the half-mirror support arm 171 rotate counterclockwise in FIG. 3, the half mirror 111 contacts the mirror stoppers 175 and 176 as shown in FIG. 1. Since the half mirror 111 receives the force in the arrow A direction from the torsion spring (not shown), it is held at the state shown in FIG. 1 or in the second optical path splitting state.

In shifting the half mirror 111 from the first optical path splitting state to the second optical path splitting state, the sub-mirror 122 rotates around the rotating shaft 125 clockwise in FIG. 3 and moves to the lower part of the mirror box: Before the half mirror 111 shifts from the first optical path splitting state to the second optical path splitting state, the sub-mirror 122 moves to the lower part of the mirror box, preventing the collision between the half mirror 111 and the sub-mirror 122.

In the second optical path splitting state, part of the light from the image-taking lens 103a is reflected on the half mirror 111 and introduced to the focus detecting unit 121 as shown in FIG. 1, and the rest of the light transmits the half mirror 111 and reaches the image-pickup device 106.

In shifting the first optical path splitting state (FIG. 3) to the third optical path splitting state (FIG. 5), the half-mirror driving lever 170 rotates clockwise in FIG. 3 and retreats the half mirror 111 from the shooting optical path to the upper part in the camera body 100 (towards the focusing screen 105). As the sub-mirror 122 rotates around the rotating shaft 125 clockwise in FIG. 3, the sub-mirror 122 retreats from the shooting optical path to the lower portion in the camera body 100.

In the third optical path splitting state, the light from the image-taking lens 103a reaches the image-pickup device 106 as shown in FIG. 5.

A description will now be given of the viewfinder mode switching action in the above structured camera system.

While the electric circuits act in the camera system, the camera system controller 135 monitors states of various switches in the camera body 100 via the operation detecting circuit 136. The camera system controller 135 starts switching the viewfinder mode as soon as it detects the operation of the viewfinder mode switch 123 (step S120 in FIG. 9).

Figure 8:
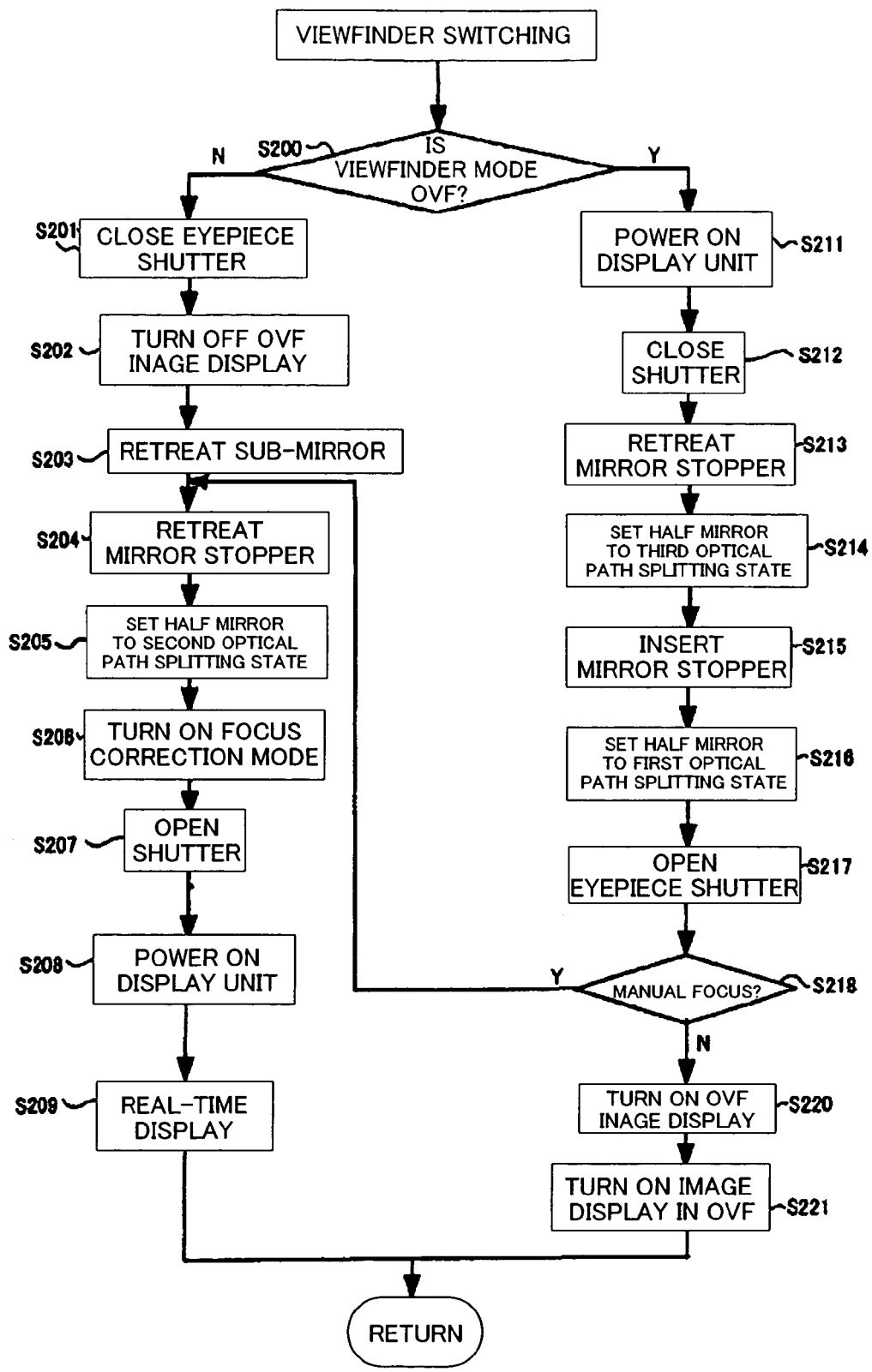
FIG. 8 is a flowchart showing a viewfinder mode switching action in the camera system according to one embodiment.

FIG. 8 is a flowchart for explaining the viewfinder mode switching action.

In step S200, the camera system controller 135 detects a current viewfinder mode, and the flow proceeds to step S201 when the operation of the viewfinder mode switch 123 commands switching from the OVF mode to the EVF mode. On the other hand, when a switch from the EVF mode to the OVF mode is directed, the flow proceeds to step S211.

A description will now be given of a switch from the OVF mode to the EVF mode. In the OVF mode, the half mirror 111 and the sub-mirror 122 are in the first optical path splitting state (FIG. 3). Since the EVF mode does not introduce the object light to the viewfinder optical system, the eyepiece shutter 163 closes in the step S201: The camera system 135 controls driving of the eyepiece shutter driver (not shown), and moves the eyepiece shutter 163 to the optical path in the viewfinder optical system.

This attempts to prevent a user from considering it a breakdown by mistake that he cannot view the object image via the viewfinder optical system, and to prevent the light outside the camera from entering the camera body 100 and finally the image-pickup device 106 via the eyepiece part of the viewfinder optical system and from causing the ghost.

Step S202 deactivates the viewfinder field in the OVF information display unit 180 through control over driving of the information display circuit 142.

Since the eyepiece shutter 163 has closed through step S201, the user views nothing even when he attempts to display specific information in the finder field. This configuration stops driving the OVF information display unit 180 and restrains unnecessary power and battery consumptions in the camera system.

Step S203 moves the sub-mirror 122 to the lower part of the mirror box and retreats it from the shooting optical path so as to transfer the half mirror 111 to the second optical path splitting state.

Step S204 controls driving of the mirror driving controller 145 and retreats the mirror stoppers 160 and 161 from the moving area of the half mirror 111. After the mirror stopper 160 and 161 retreat, the step S205 rotates the half-mirror driving lever 170 counterclockwise in FIG. 3 and the half mirror 111 transfers to the second optical path splitting state (FIG. 1) via the state shown in FIG. 2 due to the (arrow A) force of the spring (not shown).

As a result, part of the light emitted from the image-taking lens 103a is reflected on the half mirror 111 and introduced into the focus detecting unit 121, and the rest of the light transmits the half mirror 111 towards the image surface side.

In the second optical path splitting state (FIG. 1), there are slight apertures between the pin 173 and the first cam surface 170b of the half-mirror driving lever 170 and the pin 174 and the second cam surface 170c of the half-mirror driving lever 170. The half mirror 111 contacts the mirror stoppers 175 and 176 and is thereby positioned.

A position of the reflection surface of the half mirror 111 in the second optical path splitting state is approximately equal to the position of the sub-mirror 122 in the first optical path splitting state. This configuration can prevent a positional offset of the light incident upon the focus detecting unit 121 between the first and second optical path splitting states.

In the second optical path splitting state, the light from the image-taking lens 103a transmits through and refracts in the half mirror 111, and then reaches the image-pickup device 106. A focus position of the object image on the image-pickup device 106 formed by the light that has transmitted through the half mirror 111 slightly offsets from the position on the image-pickup device 106 to which the light reaches without transmitting the half mirror 111.

Therefore, step S206 runs a focus correction mode and corrects the above offset of the focus position.

In this embodiment, a focus detecting signal output from the focus detecting unit 121 in the first optical path splitting state indicates a focus position when the light from the image-taking lens 103a directly reaches the image-pickup device 106 in the third optical path splitting state. On the other hand, when the focus correction mode is set in the second optical path splitting state, the above focus detecting signal is corrected so as to indicate focus of the light from the image-taking lens 103a which transmits through the half mirror 111 and reaches the image-pickup device 106. Therefore, the focus position of the focus lens 103b in the image-taking optical system 103 in the second optical path splitting state offsets by a correction amount of the focus detecting signal from the focus position in the first and third optical path splitting states.

Therefore, in shooting by turning on SW2 in the EVF mode, or in switching the optical path splitting system from the second optical path splitting state to the third optical path splitting state, a front curtain driving mechanism of the focal plane shutter 113 is charged and the position of the focus lens 103b is corrected by the above offset amount: The focus lens 103b moves from the focus position in the second optical path splitting state to the focus position of the third optical path splitting state. Then, the focal plane shutter 113 opens for a predetermined time period for shooting by the image-pickup device 106.

The above configuration enables a focused image to be confirmed on the display unit 107 in the EVF mode (or in the second optical path splitting state), and a focused image to be captured even in shooting in the third optical path splitting state.

Step S207 precedes the front curtain of the focal plane shutter 113 for the bulb exposure, allowing the object light that has transmitted the image-taking optical system 103 to continuously reach the image-pickup device 106 and the image to be displayed on the display unit 107.

Step S208 powers on the display unit 107. Step S209 continues the image-pickup device 106's image pickup action of the object image that is formed by the image-taking optical system 103, and allows the image data read from the image-pickup device 106 and processed, to be displayed on the display unit 107 on a real-time basis. This is an end of a switching action from the OVF mode to the EVF mode.

Figure 13:
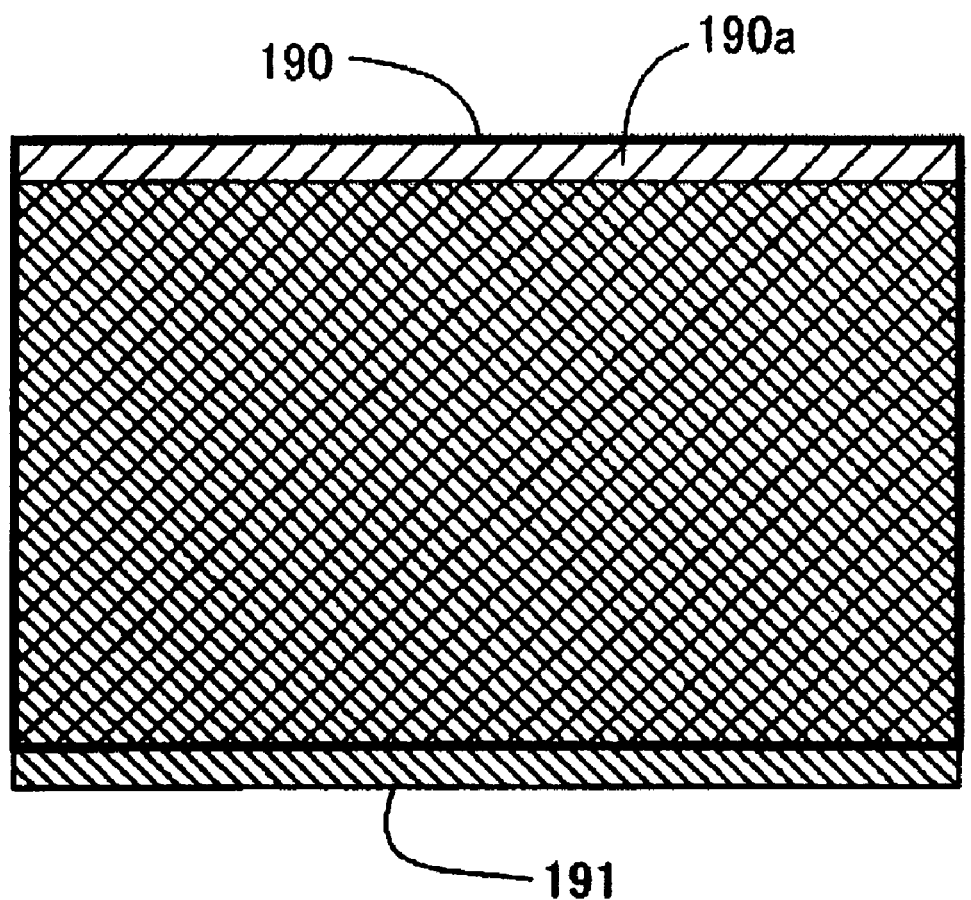
FIG. 13 is a view showing a relationship between an image pickup range and an image range which can be output to a display unit.

In the second optical path splitting state or the EVF mode, the light from the image-taking lens 103a refracts in the half mirror 111 and reaches the image-pickup device 106. Therefore, as shown in FIG. 13, the light receiving area 190 of the image-pickup device 106 in the second optical path splitting state may slightly offset from the light receiving area of the image-pickup device 106 in the third optical path splitting state in the longitudinal direction of the image-pickup device 106 in FIG. 1. In other words, the real-time displayed image on the display unit in the second optical path splitting state may not accord with the image captured in the third optical path splitting state.

An area 190a that does not overlap an area 191 in the area 190 is displayed on a real-time basis on the display unit 107, but is not included in an area shot in the third optical path splitting state.

Figure 14:
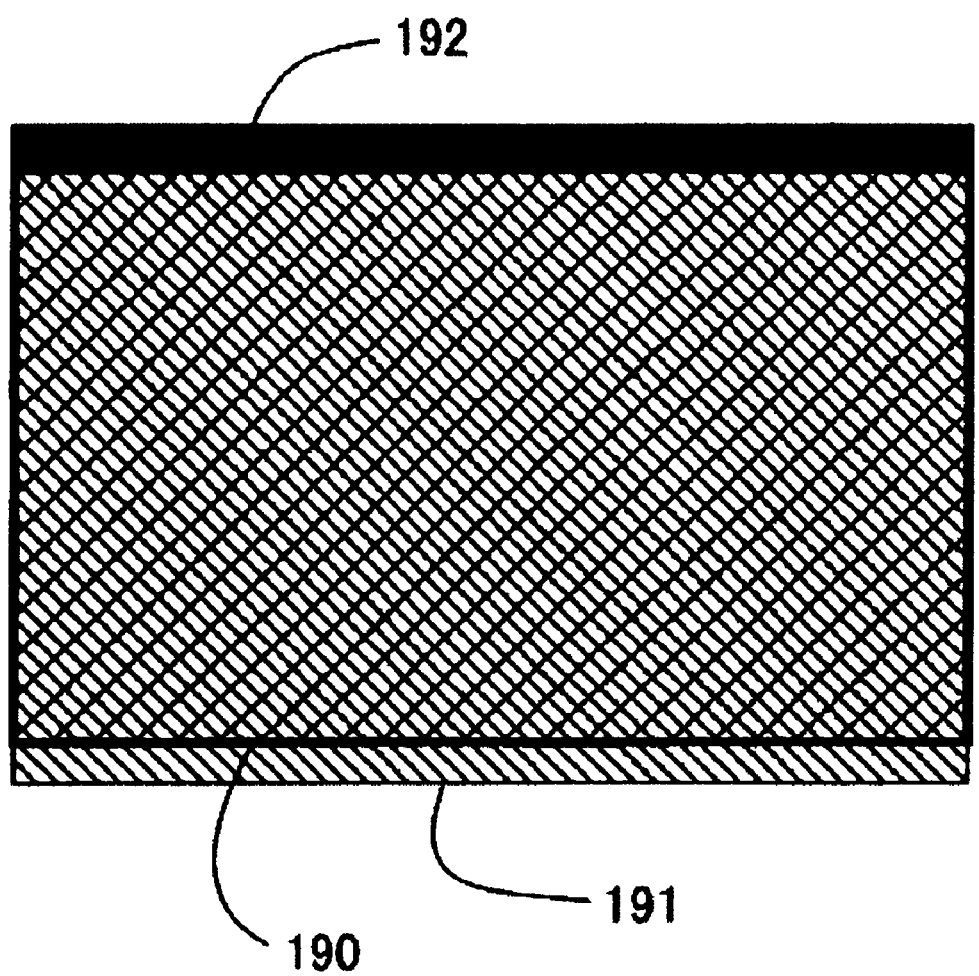
FIG. 14 is a view showing a relationship between an image pickup range and an image range which can be output to a display unit.

The camera of this embodiment blacks out the area 192 corresponding to the area 190a in the image area displayed on the display unit 107 on a real-time basis (FIG. 13) as shown in FIG. 14, and prevents a display of the entire area 190. The playback processor 134 handles this process.

This configuration prevents a problem in that actually shot images include an image that is not displayed on the display unit 107 on a real-time basis.

A description will now be given of a transfer from step S200 to step S211 to switch the EVF mode to the OVF mode.

In the EVF mode, the half mirror 111 and the sub-mirror 122 are in the second optical path splitting state (FIG. 1), and the display unit 107 provides a real-time display.

Steps S211 stops driving of the display unit 107 and image pickup action by the image-pickup device 106.

Step S212 runs a back curtain of the focal plane shutter 113, thus closes the shutter, and charges the front and back curtain driving mechanisms for a shooting preparation. Step S213 retreats the mirror stoppers 160 and 161 from the moving area of the half mirror 111 and allows a movement of the half mirror 111 in the subsequent steps.

Step S214 rotates the half-mirror driving lever 170 clockwise in FIG. 1 and transfers only the half mirror 111 in order of the state shown in FIG. 2, the state shown in FIG. 3, the state shown in FIG. 4, and the state shown in FIG. 5. The half mirror 111 shifts to the third optical path splitting state (FIG. 5) via the first optical path splitting state (FIG. 3).

Step S215 moves the mirror stoppers 160 and 161 in the moving area of the half mirror 111, and moves the half mirror 111 to a predetermined location for positioning.

As described above, the half mirror 111 is shifted to the third optical path splitting state after the mirror stoppers 160 and 161 are retreated from the moving area of the half mirror 111, and then the mirror stoppers 160 and 161 are moved in the moving area of the half mirror 111. Therefore, the half mirror 111 does not collide with the mirror stopper 160 and 161, and the mechanical reliability improves in switching the OFV mode to the EVF mode.

Step S216 rotates the half-mirror driving lever 170 counterclockwise in FIG. 5, and turns the half mirror 111 from the third optical path splitting state (FIG. 5) to the first optical path splitting state (FIG. 3) via the state shown in FIG. 4. Here, the half mirror 111 receives the force of a spring (not shown) in the mirror driving mechanism 150, and contacts the mirror stoppers 160 and 161.

Step S217 opens the eyepiece shutter 163 in the viewfinder optical system.

In step S218, the camera system controller 135 determines whether or not a manual focus mode is set, based on an operation status of an AF/MF switch (not shown) in the camera system. When the manual focus mode is set, the flow proceeds to step S208. When the manual focus mode is not set and the autofocus mode is set, the flow proceeds to step S220.

In the manual focus mode, it is unnecessary to operate the focus detecting unit 121, and use of the EVF instead of the OVF provides a defocus amount of the background (subject image) more precisely. Therefore, when the manual focus mode is set, the flow proceeds to step S204 for the real-time display on the display unit 107. When the flow proceeds from the step S218 to S204, the eyepiece shutter 163 is closed.

Step S220 moves the sub-mirror 122 into the shooting optical path at a predetermined position to introduce to the focus detecting unit 121 the object light that has transmitted through the half mirror 111. During the processes from step S211 to S218, the sub-mirror 122 is located at a position of the second optical path splitting state (FIG. 1) or a position that retreats from the shooting optical path, and operates when the flow proceeds to step S220.

In step S221, the camera system controller 135 drives the OVF information display unit 180, and activates the information display function in the viewfinder. This is an end of a switch from the EVF mode to the OVF mode.

This embodiment sets the second optical path splitting state (FIG. 1) to the optical path splitting system that includes the half mirror 111 and the sub-mirror 122 in displaying a shot image on the display unit 107 or in the EVF mode, and introduces the light from the image-taking lens 103a to the focus detecting unit 121. This accelerates focusing in the EVF mode by the phase difference detection at the focus detecting unit 121.

Figure 9:
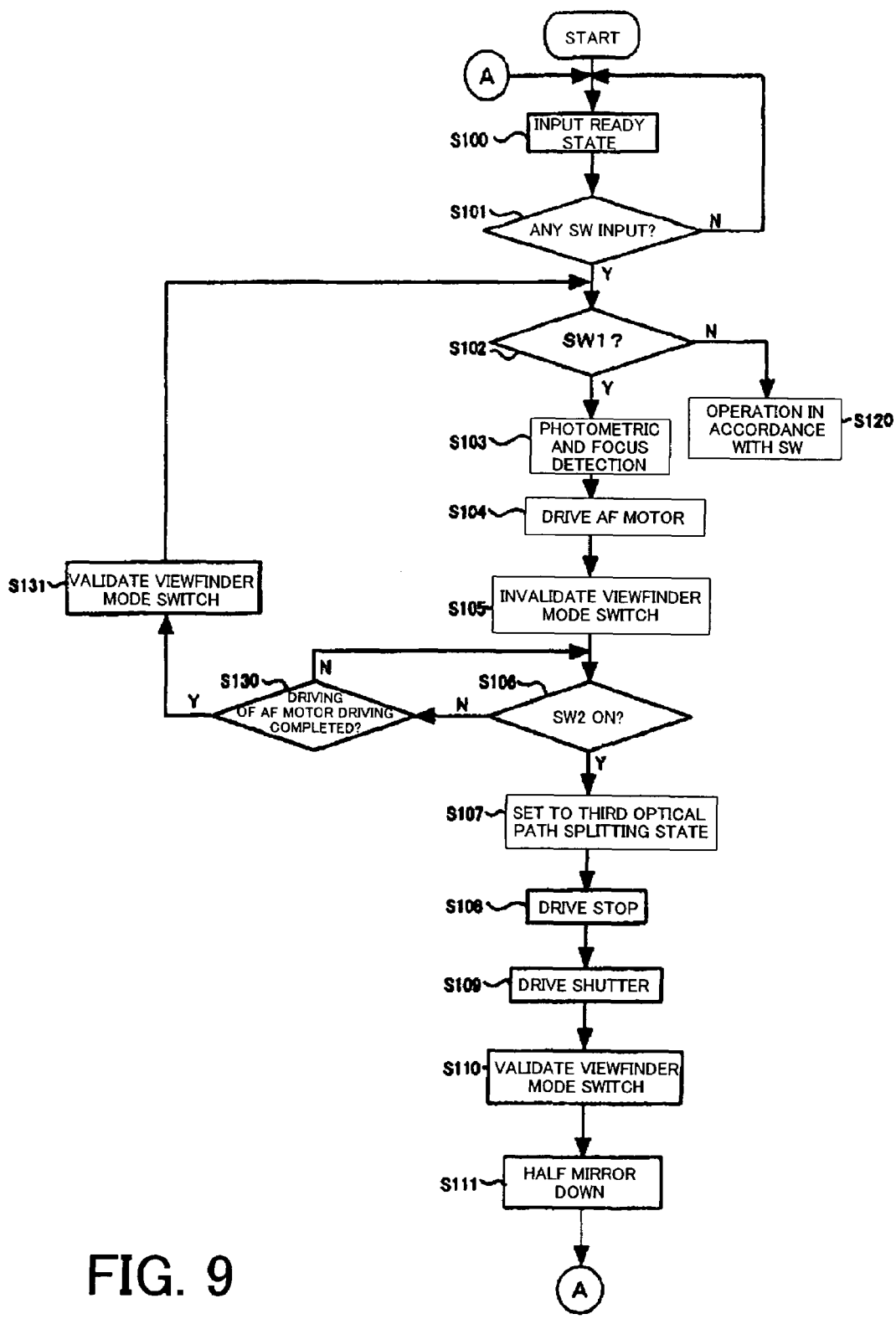
FIG. 9 is a flowchart of a shooting action of the camera system according to a first embodiment.

Referring now to FIG. 9, a description will be given of the shooting in the camera system of this embodiment. In shooting, the display unit 107 provides the real-time display in accordance with a setting of the viewfinder mode, and the viewfinder field displays specific information due to driving of the OVF information display unit 180.

Step S100 sets the input ready state from a switch, such as the release button 120. In step S101, the camera system controller 135 determines whether or not there is any inputs from various switches in the camera body 100 via the operation detecting circuit. When there is an input from the switch, the flow proceeds to step S102.

Step S102 determines whether or not an input signal detected in step S101 is an input of SW1 by the half-press of the release button 120. When it is the SW1 input, the flow proceeds to step S103; when not, the flow proceeds to step S120.

In step S120, the camera system controller 135 operates in accordance with the input signal. For instance, it switches the viewfinder mode, or sends information on a aperture value to the lens system controller 141 when the user sets the aperture value. The lens system controller 141 that receives the information on the aperture value operates the stop 102 by controlling driving of the stop driving actuator 143.

In step S103, the camera system controller 135 calculates the subject brightness based on an output from a photometric sensor (not shown) in the camera body 100 (photometry). The AF controller 140 detects focus (or a defocus amount) of the image-taking optical system 103 based on an output of the focus detecting sensor 167 (focus detection).

Step S104 drives the focus lens 103b based on a driving amount of the focus lens 103b obtained from the focus detection result (or a defocus amount) in step S103. More specifically, the camera system controller 135 sends to the lens system controller 141 information on driving (amount and direction) of the focus lens 103b obtained from the defocus amount. The lens system controller 141 moves the focus lens 103b along the optical axis L1 by driving the AF motor 147.

Step S105 prohibits or invalidates an input of the viewfinder mode switch 123 approximately simultaneous with a driving start of the AF motor 147, and the flow proceeds to step S106.

The following problem occurs when the viewfinder mode switches in accordance with the input of the viewfinder mode switch 123 while the focus lens 103b is being driven:

As discussed above, when the focus correction mode turns on in the EVF mode, the output signal of the focus detecting unit 121 is corrected and an offset occurs between a focus position of the focus lens 103b in the EVF mode and a focus position of the focus lens 103b in the OVF mode. Therefore, when driving of the focus lens 103b starts at one viewfinder mode among the OVF and EVF modes, and the viewfinder mode switches during this driving, the object image observed in the switched viewfinder mode defocuses after the driving of the focus lens 103b ends.

Accordingly, this embodiment invalidates the input of the viewfinder mode switch 123 during the driving of the focus lens 103b, preventing switching of the viewfinder mode and the above defocus of the object image.

In step S106, the camera system controller 135 determines whether or not there is an input of SW2 via the operation detecting circuit 136. When there is no SW2 input, the flow proceeds to step S130, whereas when there is a SW2 input, the flow proceeds to step S107.

In step S130, the lens system controller 141 sends a focus completion signal to the camera system controller 135 after finishing driving of the AF motor 147 or moving the focus lens 103b to a predetermined in-focus position. The camera system controller 135 determines whether or not driving of the AF motor 147 ends based on a communication with the lens system controller 141. When the driving of the AF motor 147 has not yet been completed, the flow proceeds to step S106, and when the driving of the AF motor is completed, the flow proceeds to step S131.

Step S131 validates an input of the viewfinder mode switch 123, which was prohibited by the step S105, and the flow returns to step S102.

Step S107 turns the optical path splitting system to the third optical path splitting state (FIG. 5) by controlling driving of the mirror driving controller 145. More specifically, in shooting in the EVF mode, the half mirror 111 in the second optical path splitting state is retreated from the shooting optical path and turned to the third optical path splitting state. In shooting in the OVF mode, the half mirror 111 and the sub-mirror 122 in the first optical path splitting state are retreated from the shooting optical path and turned to the third optical path splitting state.

In step S108, the camera system controller 135 sends to the lens system controller 141 information on a aperture value obtained by the photometric action of the step S103. The lens system controller 141 that has received the information on the aperture value operates the stop 102 in accordance with the aperture value by controlling driving of the stop driving actuator 143.

When it is determined that the driving of stop 102 is unnecessary based on the photometric result of step S103, the flow proceeds to step S109 with no process of step S108.

In step S109, the camera system controller 135 starts exposing the image-pickup device 106 after opening the focal plane shutter 113. This starts shooting, and the signal read from the image-pickup device 106 is properly processed through the RGB image processor 131, the YC processor 132 and the recording processor 133. The processed image data is recorded in a recording medium (not shown) and displayed on the display unit 107 via the playback processor 134.

Step S110 validates an input of the viewfinder mode switch 123, which was prohibited by step S105, and proceeds to step S111. The process of step S110 may be the same as that of step S109.

In step S111, the camera system 135 controls driving of the mirror driving controller 145, and turns the third optical path splitting state to the first or second optical path splitting state: In the EVF mode, the half mirror 111 in the third optical path splitting state is advanced into the shooting optical path and turned to the second optical path splitting state. In the OVF mode, the half mirror 111 and the sub-mirror 122 in the third optical path splitting state are advanced into the shooting optical path and turned to the first optical path splitting state.

Figure 10:
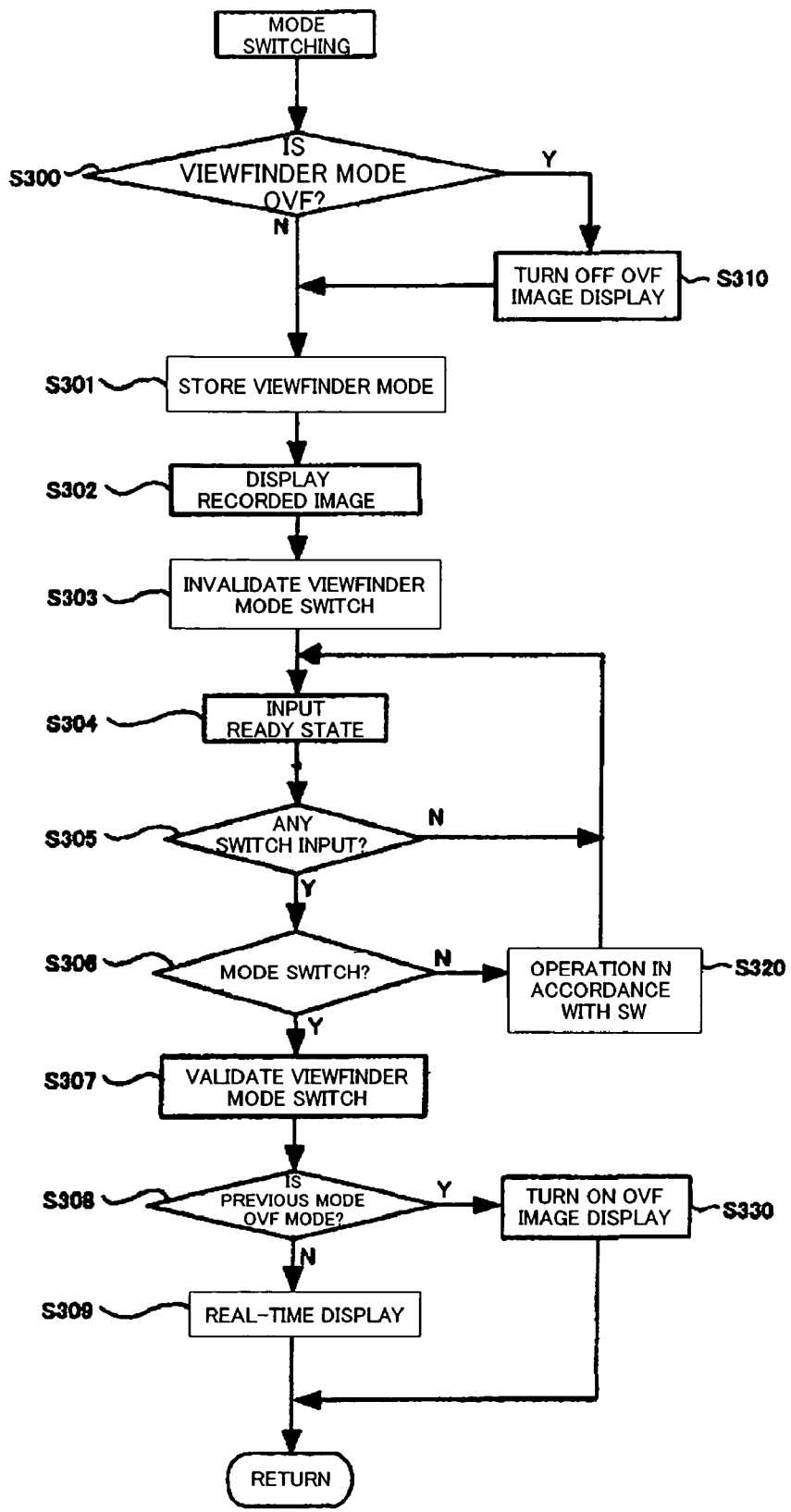
FIG. 10 is a flowchart showing a switching action between a shooting mode and a playback mode in the camera system according to the first embodiment.

Referring now to FIG. 10, a description will be given of switching between the shooting mode and the playback mode by the shooting/playback mode switch 127.

The camera system controller 135 determines, via the operation detecting circuit 136, whether or not the shooting/playback mode switch 127 is operated. When the shooting/playback mode switch 127 is operated, step S300 determines whether or not the current viewfinder mode is the OVF mode. When the OVF mode is set, the flow proceeds to the step S310; when the EVF mode is set, the flow proceeds to the step S301.

Step S310 controls driving of the information display circuit 142, and deactivates the viewfinder field by the OVF information display unit 180, thereby saving unnecessary power and battery consumptions.

Step S301 stores information on the viewfinder mode determined by the step S300 in the memory 135a in the camera system controller 135.

Step S302 reads the image data recorded in a recording medium (not shown) via a recording processor 133, and the playback processor 134 processes the read image data. The display unit 107 displays the image data processed by the playback processor 134.

Step S303 invalidates or prohibits an input of the viewfinder mode switch 123. This function prevents an unnecessary operation of the viewfinder mode switch 123, which would otherwise switch the viewfinder mode in the playback mode. More specifically, when a playback mode is switched to a shooting mode, this function prevents a switch of the viewfinder mode contrary to user's intent or to a mode different from user's memory.

Thereby, when the user selects the shooting mode after the display unit 107 plays a captured image in response to a switch from the shooting mode to the playback mode, the user feels no discomfort with an observation of the subject image. In the same viewfinder mode of the previous shooting mode, the user can comfortably determine a scene for the current shooting mode.

Step S304 waits for an input of a switch, such as a release button 129, while allowing the display unit 107 to display the captured image.

In step S305, the camera system controller 135 determines, via the operation detecting circuit 136, whether or not any of various switches, such as the release button 120, are operated. When none of the switches are operated, the flow proceeds to step S304. When the switch is operated, the flow proceeds to step S306.

Step S306 determines whether the operated switch is the shooting/playback mode switch 127. When it is an input of the shooting/playback mode switch 127, the flow proceeds to step S307. On the other hand, when it is an input of another switch, such as an image deletion switch and a display screen switch (not shown), the flow proceeds to step S320.

Step S320 operates in accordance with the input of the other switch, such as a deletion of image data when it is an input of the image deletion switch, and a switch of a captured image on the display unit 107 when it is an input of the display screen switch. The flow returns to step S304 when the process in the step S320 ends, and waits for an input.

Step S307 switches the playback mode to the shooting mode, and validates the input of the viewfinder mode switch 123, which is prohibited by the step S303. Thereby, the user operates the viewfinder mode switch 123, and freely switches the viewfinder mode.

Step S308 determines whether or not the viewfinder mode stored in the step S301 is the OVF mode. When it is the OVF mode, the flow proceeds to step S330; when it is the EVF mode, the flow proceeds to step S309.

Step S330 activates the information display function in the viewfinder field by the OVF information display unit 180 by controlling driving of the information display circuit 142. Since this embodiment invalidates the input of the viewfinder mode switch 123 in switching the shooting mode to the playback mode, the viewfinder mode does not switch and the half mirror 111 and the sub-mirror 122 are not driven. Therefore, when the OVF mode is set before the mode is switched to the playback mode, and then the playback mode is again switched to the shooting mode, the OVF mode is available only by driving the OVF information display unit 180.

Step S309 provides a real-time display of the display unit 107. As discussed above, when the shooting mode is switched to the playback mode, the half mirror 111 and the sub-mirror 122 are not driven. Therefore, when the EVF mode is set before the mode is switched to the playback mode, and then the playback mode is again switched to the shooting mode, the real-time display is available only by starting a readout of an image from the image-pickup device 106.

While this embodiment invalidates an operation of the viewfinder mode switch 123 in the playback mode as discussed above, the present invention is not limited to this embodiment and the half mirror 111 and the sub-mirror 122 may not be driven in the playback mode. For example, suppose that when another switch other than the viewfinder mode switch 123 is operated, a switch of the viewfinder mode is adapted to associate with an action in accordance with the command from the other switch. During the setting of the playback mode, the viewfinder mode can be adapted not to switch even when the other switch is operated.

A description will now be given of signal processing for a focus detection by the focus detecting unit 121.

The (object) light emitted from the image-taking lens 103a is reflected on the half mirror 111 in the second optical path splitting state, and on the sub-mirror 122 on the first optical path splitting state, and then enters the condenser lens 164 provided at the lower portion of the mirror box. The light incident upon the condenser lens 164 deflects on the mirror 165, and forms a secondary image of the object on the focus detecting sensor 167 by an operation of a re-imaging lens 166.

The focus detecting sensor 167 has at least two pixel columns. A relative lateral shift is seen between signal waveform outputs from the two pixel columns in accordance with the imaging state on the focus detecting area of the object image that is formed by the image-taking optical system 103. A shift direction of the output signal waveform inverts depending upon whether the imaging state is a front focus or a back focus. It is the principle of focus detection to detect a shift direction and a shift amount (or a phase difference) using such an approach as the correlation operation.

Figure 11:
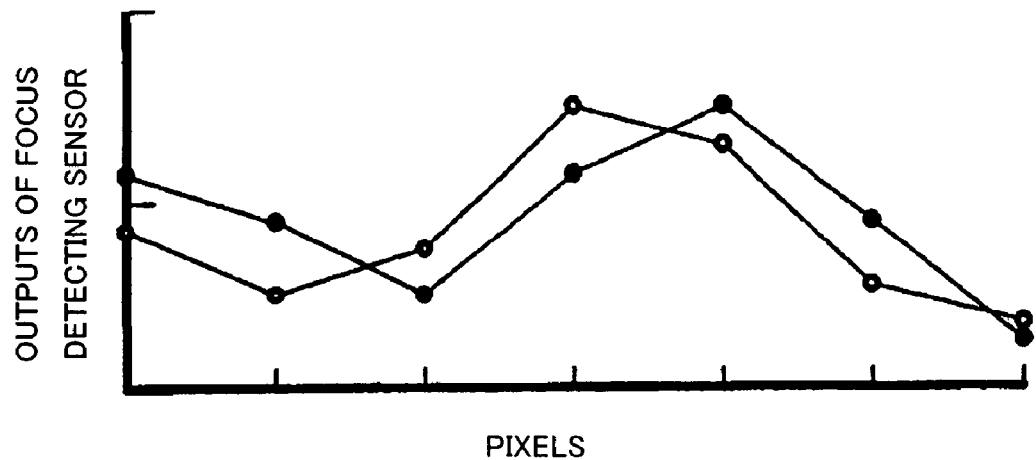
FIG. 11 is a view showing an output signal waveform of a focus detecting sensor when the image-taking optical system is an out-of-focus state.
Figure 12:
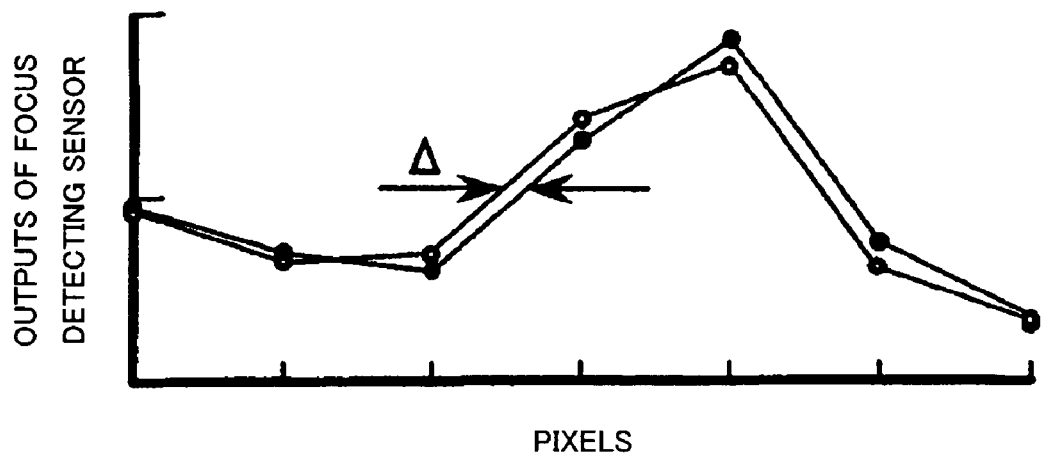
FIG. 12 is a view showing an output signal waveform of a focus detecting sensor when the image-taking optical system is an in-focus.

FIGS. 11 and 12 show output signal waveforms of focus detecting sensor 167 input to the AF controller 140. The abscissa axis indicates a pixel arrangement, and the ordinate axis indicates an output value of the focus detecting sensor 167. FIG. 11 shows an output signal waveform at a defocus state from the object image. FIG. 12 shows an output signal waveform at a focus state from the object image.

In general, the light used for focus detection is not the same as the imaging light in the aperture state but part of the imaging light. In other words, the focus detection uses dark F-number light. When a mechanical error in the camera is considered, a position of the image-pickup device 106 and a position of the focus detecting sensor 167 are not, strictly speaking, optically conjugate with each other.

Therefore, even in the focus state on the object image, as shown in FIG. 12, there is a slight initial phase difference $\Delta$ between two output signal waveforms. This slight initial phase difference $\Delta$ is different from that used for correction to a focus detection signal in the above focus correction mode (see step S206 in FIG. 8).

Since a true phase difference is given by subtracting the initial phase difference $\Delta$ a phase difference detected through a correlation operation of two images, the initial phase difference $\Delta$ itself does not usually pose a problem.

As described above, the sub-mirror 122 in the first optical path splitting state or the half mirror 111 in the second optical path splitting state can introduce the light used for the focus detection in this embodiment. However, the reflection surface position of the sub-mirror 122 in the first optical path splitting state (FIG. 3) does not completely accord with the reflection surface position of the half mirror 111 in the second optical path splitting state (FIG. 1) in view of the mechanical accuracy, and different optical path splitting states have different values of the initial phase difference $\Delta$. Thus, the true phase differences in the first and second optical path splitting states cannot be given merely by subtracting a constant initial phase difference $\Delta$ from the phase difference detected through the correlation operation.

The usual component processing accuracy may offset two reflection positions from each other by about 30 μm in the perpendicular direction of the reflection surface. An attempt to reduce the mechanical offset on the reflection surface position would remarkably increase the component processing cost.

Accordingly, this embodiment sets the initial phase differences $\Delta$ for the first and second optical path splitting states, respectively, and uses the initial phase difference $\Delta$ corresponding to the selected optical path splitting state so as to correct the output signal of the focus detecting sensor 167.

Thereby, a true phase difference corresponding to the selected optical path splitting state can be obtained, and precise focus detections are available based on the phase difference.

Thus, whether or not the image-taking optical system is in the in-focus state can be determined by determining the identity of a pair of signals by considering the initial phase difference. The defocus amount can be calculated by detecting the phase difference using a known approach, such as an approach using the correlation operation disclosed, for example, in Japanese Patent Publication No. 5-88445. The obtained defocus amount is converted into the driving amount of the focus lens 103b in the image-taking optical system 103, and the focus lens 103b is driven by the driving amount for autofocus of the image-taking optical system.

The phase difference detection uses a known driving amount of the focusing lens 103b, only one driving of the lens is usually enough to obtain the in-focus position, and can provide extremely high-speed focusing.

This embodiment achieves the focus detection in the phase difference detection by the focus detecting unit 121 in the EVF mode where the display unit 107 displays the object image on the real-time basis, in addition to the OVF mode where the viewfinder optical system is used to observe the object image, accelerating the focusing of the image-taking optical system. When the continuous shooting and motion-picture shooting are available in the second optical path splitting state (FIG. 1), these shootings can obtain high-speed focusing. This embodiment does not require the conventional two focus detecting units, and prevents a large size and increased cost of the camera system.

A prohibition of a switch of the viewfinder mode between the EVF mode and the OVF mode during driving of the focus lens 103b prevents a defocus of the object image observed after the driving of the focus lens ends.

An invalidation of any operations of the viewfinder mode switch 123 during the playback mode does not cause a switch of the viewfinder mode set in a previous shooting mode to a different mode when the playback mode is switched to another shooting mode. This non-switch of the viewfinder mode does not puzzle the user, and enables the user to set a scene in the same viewfinder mode as that set in the previous shooting mode to the playback mode.

While the above embodiment discusses the camera system that drives the half mirror and the sub-mirror independently, the present invention is applicable to a camera system that drives the half mirror and the sub-mirror together. This embodiment arranges the half mirror and the sub-mirror on the shooting optical path in the OVF mode, retreats them from the shooting optical path in the EVF mode, and does not drive them in the playback mode.

This application claims foreign priority benefits based on Japanese Patent Applications Nos. 2004-108504 and 2004-108505, both filed on Mar. 31, 2004, each of which is hereby incorporated by reference herein in its entirety as if fully set forth herein.

What is claimed is:

1. An image-taking apparatus comprising:
    an image-pickup device for photoelectrically converting a subject image formed by light from an image-taking lens;
    a viewfinder optical system for enabling the subject image to be observed using the light;
    a focus detecting unit for detecting focus of the image-taking lens using the light;
    a mirror unit switchable between a first state and a second state to be switched, said first state being used to introduce the light into said viewfinder optical system and said focus detecting unit, and said second state being used to introduce the light to said image-pickup device and said focus detecting unit; and
    a controller for switching between said first state of said mirror unit and said second state of said mirror unit, and driving of a focus lens in the image-taking lens based on a detection result by said focus detecting unit,
    wherein a target driving position of the focus lens differs between said first state of said mirror unit and said second state of said mirror unit,
    wherein said controller prohibits the switching of said mirror unit while the focus lens is being driven.

2. An image-taking apparatus according to claim 1, wherein said controller releases a prohibition of the switching of said mirror unit in accordance with an input from the image-taking lens, of a signal indicative of a completion of driving of the focus lens.

3. An image-taking apparatus according to claim 1, further comprising an operation member that is operated so as to command a switch between the first and second states,
    wherein said controller prohibits the switching of said mirror unit corresponding to an operation of said operation member while the focus lens is being driven in the image-taking lens.

4. An image-taking apparatus according to claim 1, wherein said first state is used to reflect the light to said viewfinder optical system and said focus detecting unit, and
    wherein said second state is used to transmit the light toward said image-pickup device, and to reflect the light to said focus detecting unit.

5. An image-taking apparatus according to claim 3, wherein said mirror unit includes:
    a first mirror member for reflecting part of the light and for transmitting the rest of the light; and
    a second mirror member for reflecting light that has transmitted through the first mirror member,
    wherein the first and second mirror members are arranged on an optical path of the light in the first state,
    wherein the first mirror member is located in the optical path and the second mirror member retreats from the optical path in the second state, and
    wherein the first and second members retreat from the optical path at an image recording time.

6. An image-taking system comprising:
    an image-taking apparatus according to claim 1; and
    an image-taking lens, attachable to said image-taking apparatus, for driving the focus lens in accordance with control by the controller.

7. An image-taking system comprising:
    an image-taking apparatus according to claim 2; and
    an image-taking lens, attachable to said image-taking apparatus, for driving the focus lens in accordance with control by the controller, and for outputting to said image-taking apparatus a signal indicative of a completion of driving of the focus lens.

8. An image-taking apparatus comprising:
    an image-pickup device for photoelectrically converting a subject image formed by light from an image-taking lens;
    a viewfinder optical system for enabling the subject image to be observed using the light;
    a mirror unit switchable between a first state and a second state to be switched, said first state being used to introduce the light to said viewfinder optical system and said focus detecting unit, and said second state being used to introduce the light to said image-pickup device and said focus detecting unit; and a controller for switching between said first state of said mirror unit and said second state of said mirror unit, and for operating between a first mode used to record an image using an output from said image-pickup device, and a second mode used to display a playback image, wherein said controller prohibits the driving of said mirror unit while driving by said second mode.

9. An image-taking apparatus according to claim 8, further comprising an operation member that is operated so as to command a switch between the first and second states, wherein said controller prohibits the driving of said mirror unit corresponding to an operation of the operation member in the second mode.

10. An image-taking apparatus according to claim 8, further comprising a focus detecting unit for detecting focus of the image-taking lens using the light, wherein the first state is used to reflect the light to said viewfinder optical system and said focus detecting unit, and wherein the second state is used to transmit the light toward said image-pickup device and to reflect said focus detecting unit.

11. An image-taking apparatus according to claim 8, wherein said mirror unit includes:

a first member for reflecting part of the light and for transmitting the rest of the light; and a second member for reflecting light that has transmitted through the first mirror member;

wherein the first and second mirror members are arranged on an optical path of the light in the first state;

wherein the first mirror member is arranged on the optical path and the second member retreats from the optical path in the second state; and wherein the first and second mirrors retreat the optical path at an image recording time.

12. An image-taking system comprising:

an image-taking apparatus according to claim 8; and an image-taking lens attachable to said image-taking apparatus.

* * * * *